United States Patent [19]

Kabasin et al.

[11] Patent Number: 5,353,591
[45] Date of Patent: Oct. 11, 1994

[54] EXHAUST HEATING CONTROL

[75] Inventors: Daniel F. Kabasin, Rochester; Donald D. Stoltman, Henrietta; William H. Pettit, Rochester; Kenneth J. Dauer, Avon; James F. Burkhard, Spencerport, all of N.Y.

[73] Assignee: General Motors Corporation, Detroit, Mich.

[21] Appl. No.: 108,926

[22] Filed: Aug. 19, 1993

[51] Int. Cl.$^5$ .............................. F01N 3/20
[52] U.S. Cl. ........................ 60/274; 60/286
[58] Field of Search ............ 60/274, 286, 303

[56] References Cited

U.S. PATENT DOCUMENTS

| | | | |
|---|---|---|---|
| 3,203,168 | 8/1965 | Thomas | 60/286 |
| 3,750,401 | 8/1973 | Nambu | 60/286 |
| 4,581,891 | 4/1986 | Usui | 60/286 |
| 4,604,868 | 8/1986 | Nomoto | 60/286 |
| 5,234,024 | 8/1993 | Stoltman | 60/286 |

Primary Examiner—Douglas Hart
Attorney, Agent, or Firm—Michael J. Bridges

[57] ABSTRACT

Control of a fuel rate and an air rate delivered to an exhaust gas heater over successive control periods by determining and periodically updating a desired heater air quantity and a desired heater air/fuel ratio, by commanding an air rate in accord with the desired heater air quantity, by adjusting the commanded air rate in accord with a sensed actual air rate, and by commanding a fuel quantity in accord with the desired heater air/fuel ratio and the sensed actual air rate or the desired heater air quantity. A quantity of excess fuel is purged from the system at the end of a control period and provided in usable form to the engine. Compensation for fuel residue in the system is made at the start of subsequent control periods.

8 Claims, 6 Drawing Sheets

EXHAUST HEATING CONTROL

FIELD OF THE INVENTION

The present invention relates to internal combustion engine emission control and, more particularly, to control of an engine exhaust gas heating apparatus.

BACKGROUND OF THE INVENTION

Engine exhaust gas may be passed through a catalyst treatment device called a catalytic converter, to reduce emission of undesirable exhaust gas constituents, such as hydrocarbons, carbon monoxide, and oxides of nitrogen. To become catalytically active following a cold start of the engine, catalytic converters rely on heat energy in the exhaust gas passing therethrough. Initiation of catalyst activity occurs at converter light-off temperature, which is typically around 400 degrees Celsius. Following a cold start, the engine may have to operate for over 100 seconds before heat energy transferred from the engine exhaust to the converter elevates the converter temperature to light-off, such that efficient conversion may occur.

To reduce the time to catalyst light-off, exhaust gas heating devices may be provided to introduce additional heat energy in the engine exhaust gas path after a cold start. Heaters have been considered for exhaust gas heating in which an air/fuel mixture is combusted and the combustion heat energy therefrom drawn into the engine exhaust gas path. To minimize the time to catalyst light-off, such heaters must be ignited as soon as possible after a start time, and once ignited, must be operated in a manner wherein maximum heat energy is transferred to the engine exhaust path and ultimately to the converter.

To provide for rapid heater ignition, it has been proposed to apply open loop control to a rate at which air and fuel are admitted to the heater until such time as ignition is detected in the heater. Open loop control of fuel and air are continued after ignition is detected in such an approach, for a period of time until catalytic converter temperature has been increased to a desirable temperature, and maintained at that temperature for a period of time after which it may be assumed that converter temperature may be maintained solely through engine exhaust gas heat energy transfer.

The conditions under which an exhaust gas heating system operates may change significantly. For example, engine exhaust gas backpressure, system temperature and system voltage can change dramatically over the course of even a single heater heating cycle. Furthermore, as the heating system ages, the efficiency of its parts, especially its actuators may deteriorate, and contamination may build up in the system. A significant effect of these changing operating conditions is that an open loop command, such as the open loop fuel and air command of the above-described prior art, may not result in a constant or predictable delivery of fuel or air to the heating system. Under such open loop control, actual air/fuel ratio in the heater may deviate from a beneficial air/fuel ratio, or heat energy generated by the heater may vary from a beneficial energy level. In such cases, the time to reach light-off may be increased, or, in extreme cases of overheating, catalytic converter damage may result.

Accordingly, it would be desirable to close the loop on exhaust gas heater input parameters, such as air or fuel delivered, for application in a control capable of adjusting the quantity of air or fuel commanded to the heater in response thereto. Additionally, it would be desirable to operate a heating system so as to reduce system contamination for increased accuracy over the life of the system.

SUMMARY OF THE INVENTION

The present invention overcomes the limitations of the described prior art by providing closed loop control of exhaust gas heater parameters. Additionally, the invention takes affirmative steps to minimize system contamination.

More specifically, the present invention controls fuel and air to an exhaust gas heater in response to a predetermined set of engine parameters indicative of an engine operating level. Rates at which air and fuel are admitted to the heater are controlled over heating periods so as to rapidly heat the engine exhaust gas. When fueling is no longer required in a control period, an attempt is made to purge the fuel system of fuel hung up therein, to minimize fuel system contamination. In a further aspect of this invention, an estimate of the amount purged, and thus of the fuel residue remaining in the fuel system is made and compensated in the fuel control at the start of the next control period.

In yet a further aspect of this invention, the air rate may be adjusted in response to a difference between a varying desired air quantity and a sensed actual air quantity. Likewise, the fuel rate may be adjusted in response to a varying desired air/fuel ratio and the desired air rate or the sensed actual air rate. In this manner, unmodelled control perturbations may be compensated appropriately.

In yet a further aspect of this invention, the purged fuel may be put to economical use, such as by introducing it in a controlled manner to an engine intake air or fuel path for consumption in the engine.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
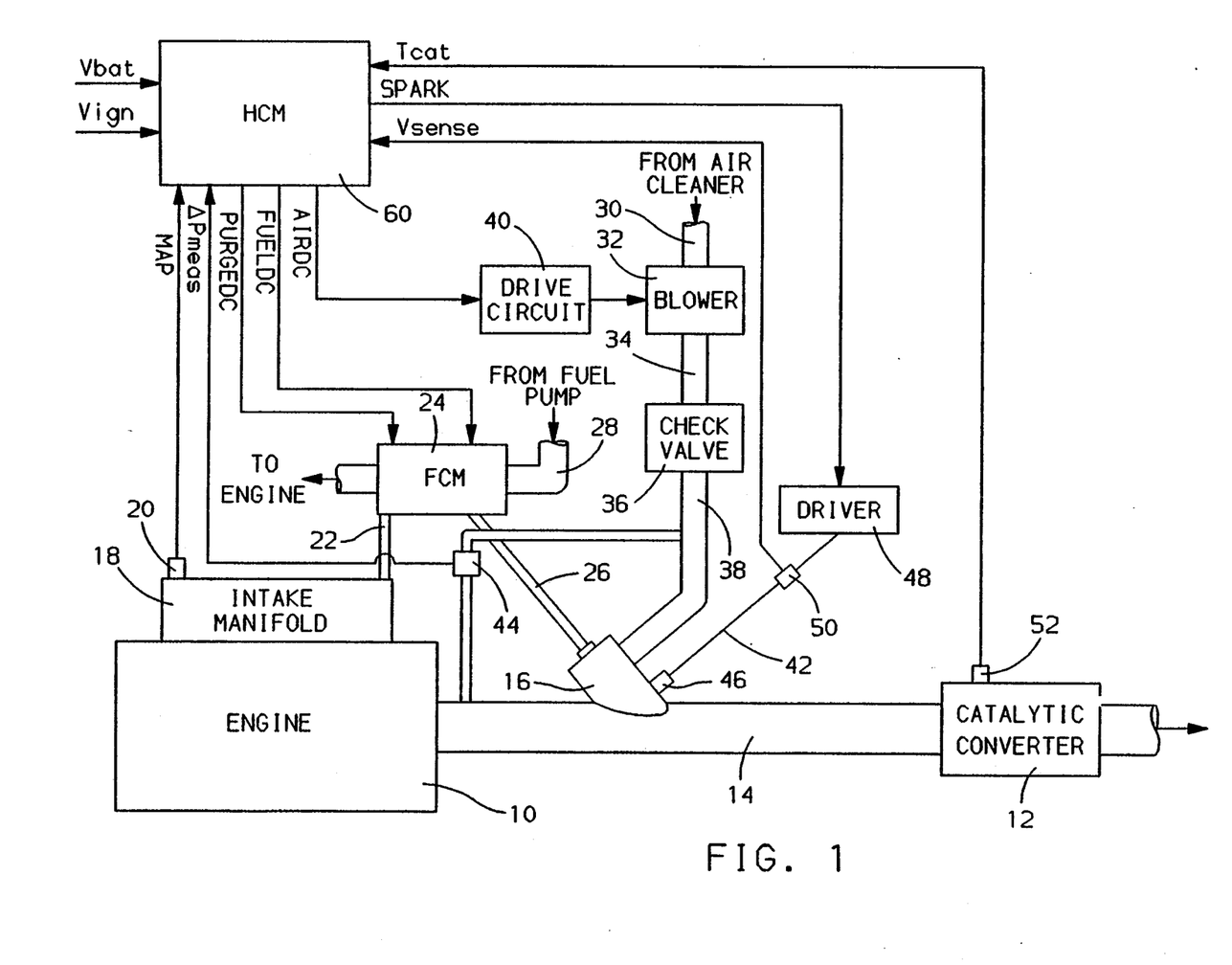
FIG. 1 is a general block diagram illustrating the hardware used in the preferred embodiment of the present invention.

FIG. 1 schematically illustrates a typical application of an exhaust heater assembly 16 controlled in accord with the present invention to the exhaust system of an internal combustion engine 10. The heater assembly is disposed in the exhaust system of the engine 10 in such a manner that engine exhaust gas passes from the engine 10 past the heater assembly 16 to a conventional catalytic converter 12, via exhaust path 14. Engine 10 includes a conventional intake manifold 18, having a manifold absolute pressure sensor 20 for measuring absolute air pressure in manifold 18, and communicating an output signal MAP indicative thereof.

A heater control module HCM 60 monitors various input signals describing engine and exhaust system parameters, and varies fuel, air, and spark to the heater assembly 16 accordingly. The HCM 60 may be an eightbit, single chip microcomputer, such as a conventional Motorola eight bit microcomputer, which executes a series of routines for heater control in accord with this invention, such as the routines described herein.

A voltage level sensor (not shown) is provided for measuring vehicle supply voltage Vbat, such as may be indicated by a sensed voltage across a vehicle battery (not shown). Furthermore, a voltage level sensor (not shown) is provided for measuring ignition voltage Vign to the system, such as may be a regulated Vbat applied when power is applied to the HCM 60. Signals Vbat and Vign indicative of their respective sensed voltage levels, are provided to HCM 60.

Combustion air is provided to the heater assembly 16 from an engine driven or electrical air blower 32. The blower receives intake air from a an air cleaner, such as a conventional air filter, via conduit 30, and passes air out via conduit 34 to check valve 36, which may be any conventional one-way valve which provides for low restriction air passage from the blower to the heater assembly 16, and provides for high restriction air passage from the heater assembly back to the blower, to minimize blower contamination from engine exhaust gasses. Air passing through check valve 36 is provided to heater assembly 16 via conduit 38.

The blower 32 is controlled by the HCM 60 via a blower command AIRDC, which may be in the form of a duty cycle at a predetermined frequency, such as 128 Hz. The command AIRDC is provided from HCM 60 to DRIVE CIRCUIT 40, a blower drive circuit, which for example may include conventional high current drivers which conduct, applying a predetermined supply voltage level across the blower, at a duty cycle prescribed by AIRDC. The rate at which air is passed from blower 32 to heater assembly 16 is thus controlled by the duty cycle of AIRDC.

Differential pressure sensor 44 is interposed between conduit 38 and the engine exhaust gas path 14 in proximity to the heater assembly 16, to measure air pressure therebetween, such as through transduced measurement of movement of a diaphragm in sensor 44. The difference in pressure is provided to HCM 60 as a control input signal $\Delta$Pmeas.

Fuel control module FCM 24 is provided fuel at a regulated pressure from a fuel pump (not shown) via fuel line 28, wherein the pump draws fuel from a vehicle fuel tank (not shown). The FCM 24 passes fuel to the engine 10 for conventional engine fuel management, and additionally meters a portion of the fuel to the heater assembly 16 via fuel line 26. For example, a conventional fuel injector solenoid valve may be located in the FCM 24 responsive to command FUELDC from HCM 60. The command FUELDC may be a pulse width modulated command at a predetermined frequency, such as 64 Hz, wherein fuel is metered to fuel line 26 from FCM 24 for the duration of each periodic pulse.

The HCM 60, in a manner to be described, determines the fuel quantity required to produce a desired air/fuel ratio in the heater assembly 16 and, in accord with the preferred embodiment of this invention, determines FUELDC as the duration of opening of the fuel injector within the FCM to provide the required fuel quantity to the heater assembly 16. FUELDC may be received in the FCM by a conventional fuel injector solenoid driver, which converts the command into a form capable of actuating the injector solenoid valve for each injection period. A nozzle or other conventional fuel delivery means is located in the heater assembly 16 at the end of fuel line 26, to assist in the metering of fuel to the heater assembly.

A redundant fuel shutoff may be provided in the form of a timer output signal which is set to a high signal at a predetermined time, such as at the start of the heater assembly control cycle (to be described) and returns low a predetermined period of time later. The connection between command FUELDC and FCM 24 may be broken, and instead, FUELDC and the timer output signal may be passed as two inputs to an AND gate, the output of which is provided to the FCM 24 as the commanded fuel injector duty cycle.

In this manner, fuel would be shut off at a predetermined time, overriding HCM fuel control. Alternatively, a diagnostic signal may be input to the AND gate in the place of the described timer output signal, to shut off fuel to the heater assembly 16 in the event a fault is detected in the system.

Still further, a signal indicative of catalytic converter temperature, such as signal Tcat (to be described) may be compared to a temperature threshold, such that when Tcat exceeds the threshold, an output signal switches low, the output signal being provided to the AND gate in the place of the described timer output signal, such that fuel shut off is guaranteed in the event the catalytic converter 12 exceeds a predetermined temperature.

Additionally in FCM 24, an electronically controlled purge valve, such as a conventional solenoid valve (not shown) is controlled by commanded PURGEDC from HCM 60. In its deactivated, relaxed state, the purge valve interrupts a path between fuel line 26 and purge line 22. When an appropriate voltage is applied to the purge valve, the valve moves to a position providing a fluid flow path from fuel line 26 to engine intake manifold 18, via purge line 22, such that during normal engine operation, the vacuum in intake manifold 18 will draw fuel residue from fuel line 26 back through FCM 24 to the purge line 22, and then to the intake manifold 18, where the fuel may be combined with an intake air stream admitted to the engine 10.

Accordingly, fuel line 26 may be purged of excess fuel after a heating cycle by energizing the purge valve via command PURGEDC, which in this embodiment is a fixed magnitude, fixed frequency, variable duty cycle command. The purge operation improves fuel controllability by eliminating unscheduled fuel from the fuel delivery path to the heater assembly 16, and reduces a potential for contamination of the fuel system including fuel line 26 and nozzle from stagnant fuel therein.

A conventional spark plug 46 may be used as an ignition source in heater assembly 16 to ignite the air/fuel mixture formed therein. A periodic control pulse SPARK is issued from the HCM 60 to an ignition driver 48, which may include a switch and a transformer, wherein the switch closes for the duration of each SPARK pulse to allow current to pass through a primary of the transformer charging up the transformer. At the falling edge of the pulse SPARK, the switch opens, interrupting current through the primary of the transformer, inducing current across the electrodes of the spark plug 46 which is connected across the transformer secondary coil. Such is in accord with general ignition control practice. The inventors intend that alternative actuators to those air, fuel, and spark actuators described in the present embodiment may be used in accord with the present invention. The invention requires only some substantial control over air, fuel and spark.

In the present embodiment in which heater ignition is provided through periodic arcing of a conventional spark plug 46, heater combustion detection may be provided using the combustion detection method and apparatus described in copending application U.S. Ser. No. 07/902249, filed Jun. 22, 1992, entitled "Combustion Detection," assigned to the assignee of this application. In general, a sense coil 50, of approximately 200 turns, such as a Wabash Magnetics solenoid, part no. 5234214, surrounds the spark plug drive line 42 in such a manner that changes in current through the drive line will, in accordance to well-established principles of electromagnetic field theory, induce current through the coil, and thus will induce potential across the coil 50, which may be monitored by HCM 60, via coil output signal Vsense.

In the absence of flame in heater assembly 16, a comparatively large voltage spike will appear across coil 50 shortly after the surge of spark inducing current passes through drive line 42. However, a comparatively small spike will appear across coil 50 when flame is present, due to an ionization effect, wherein current carrying ions are provided across the spark plug gap by flame present in proximity to the gap, reducing the electrical resistance across the gap. By distinguishing between the two spikes, as described in the above-referenced copending application, the HCM 60 may rapidly and reliably determine whether flame is present in the heater assembly 16. Temperature sensor 52, such as a conventional thermocouple or thermistor, measures temperature of catalytic converter 12 or, alternatively, of heater assembly 16, and provides an output signal Tcat indicative thereof to HCM 60.

Figure 2A:
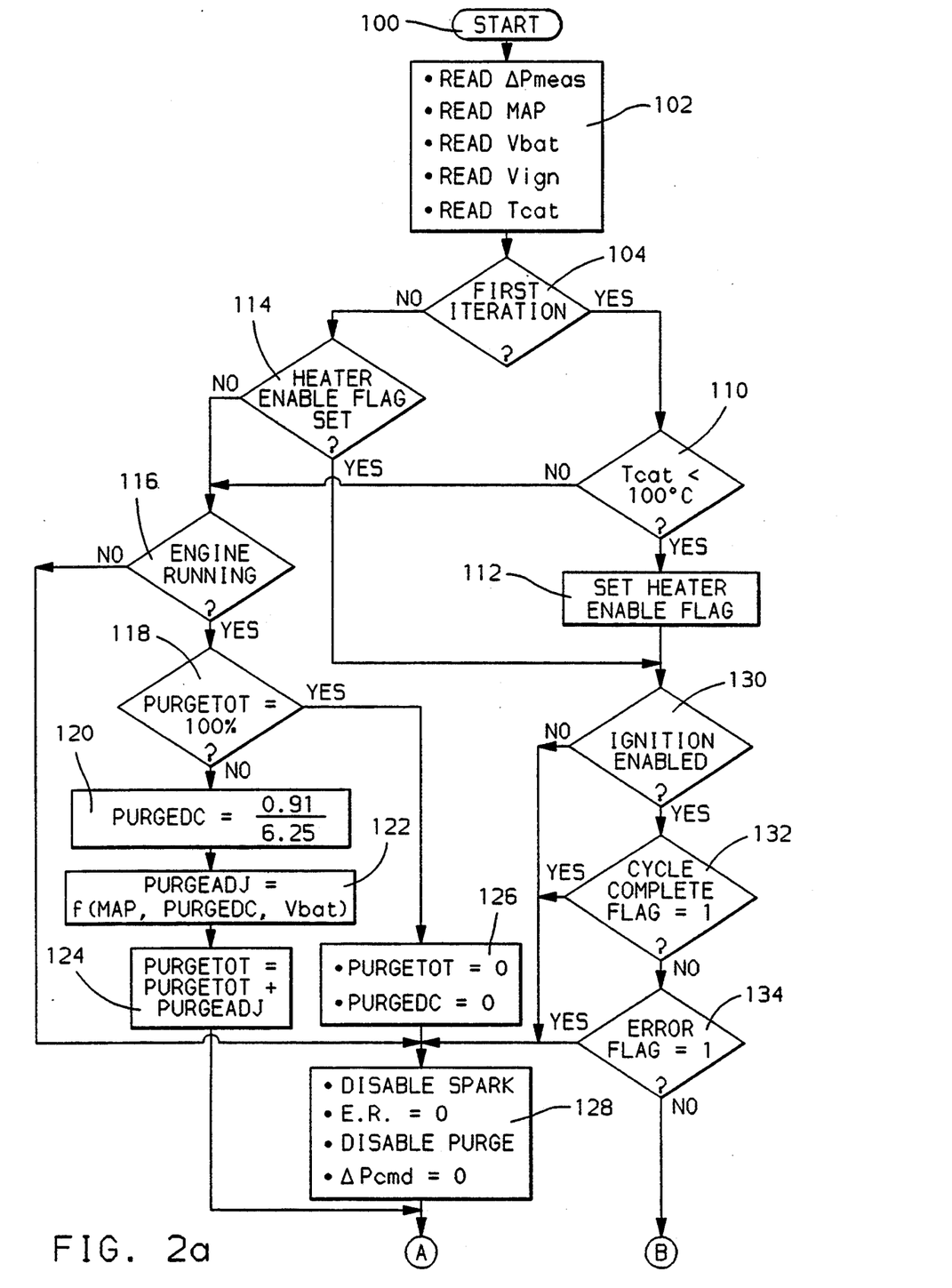
FIGS. 2a–2e are computer flow diagrams illustrating the steps used to carry out this invention in accord with the preferred embodiment.
Figure 2B:
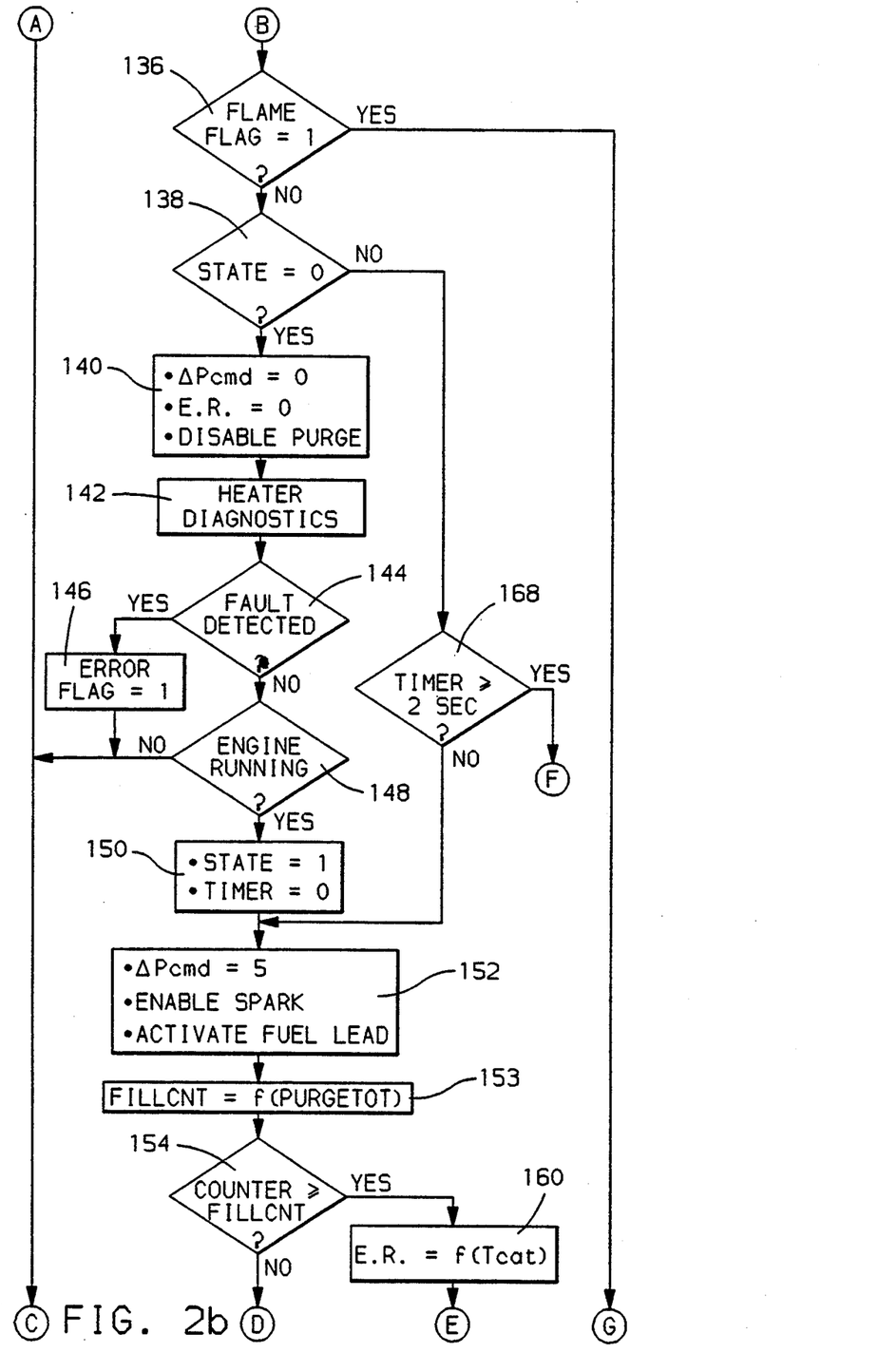
Figure 2C:
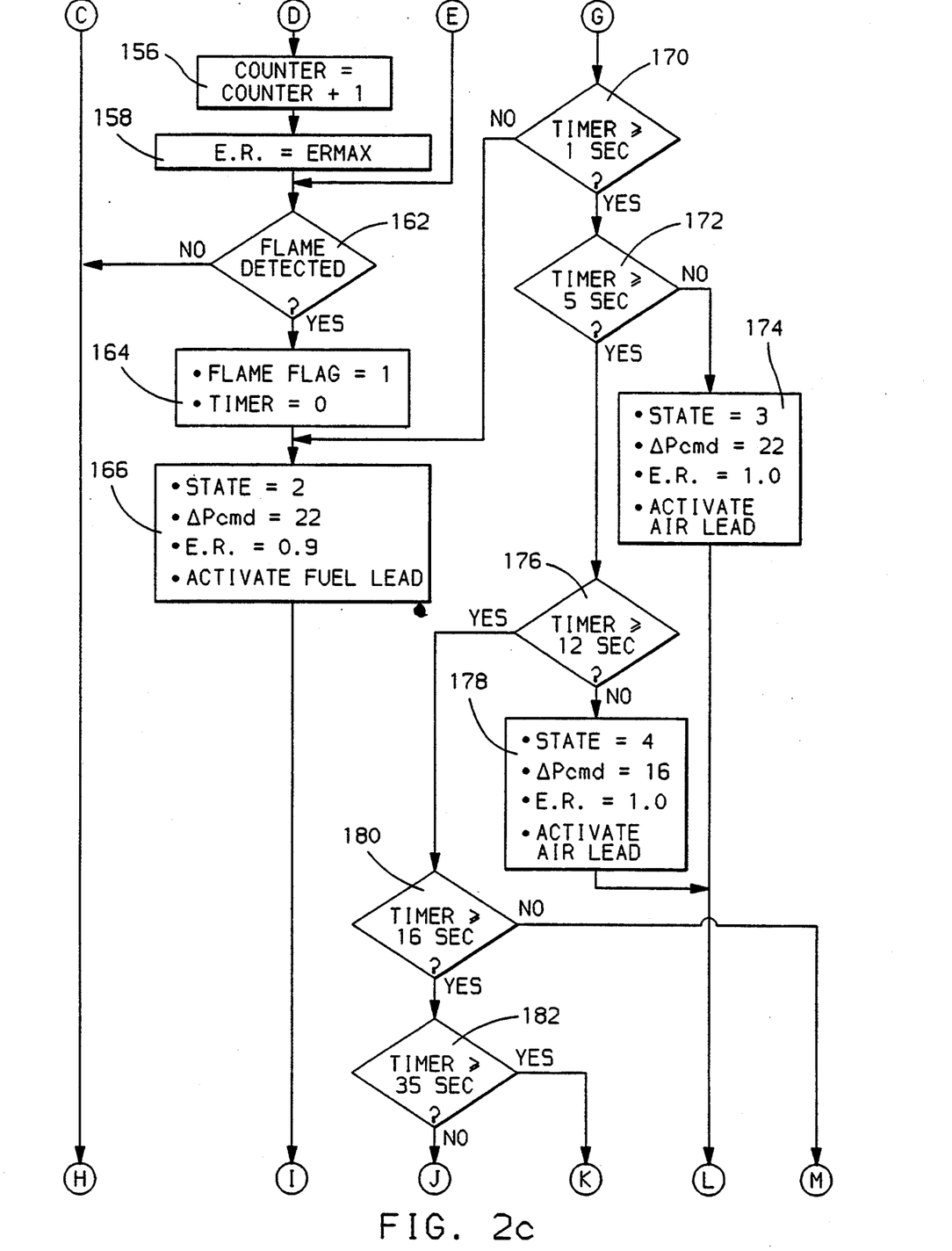
Figure 2D:
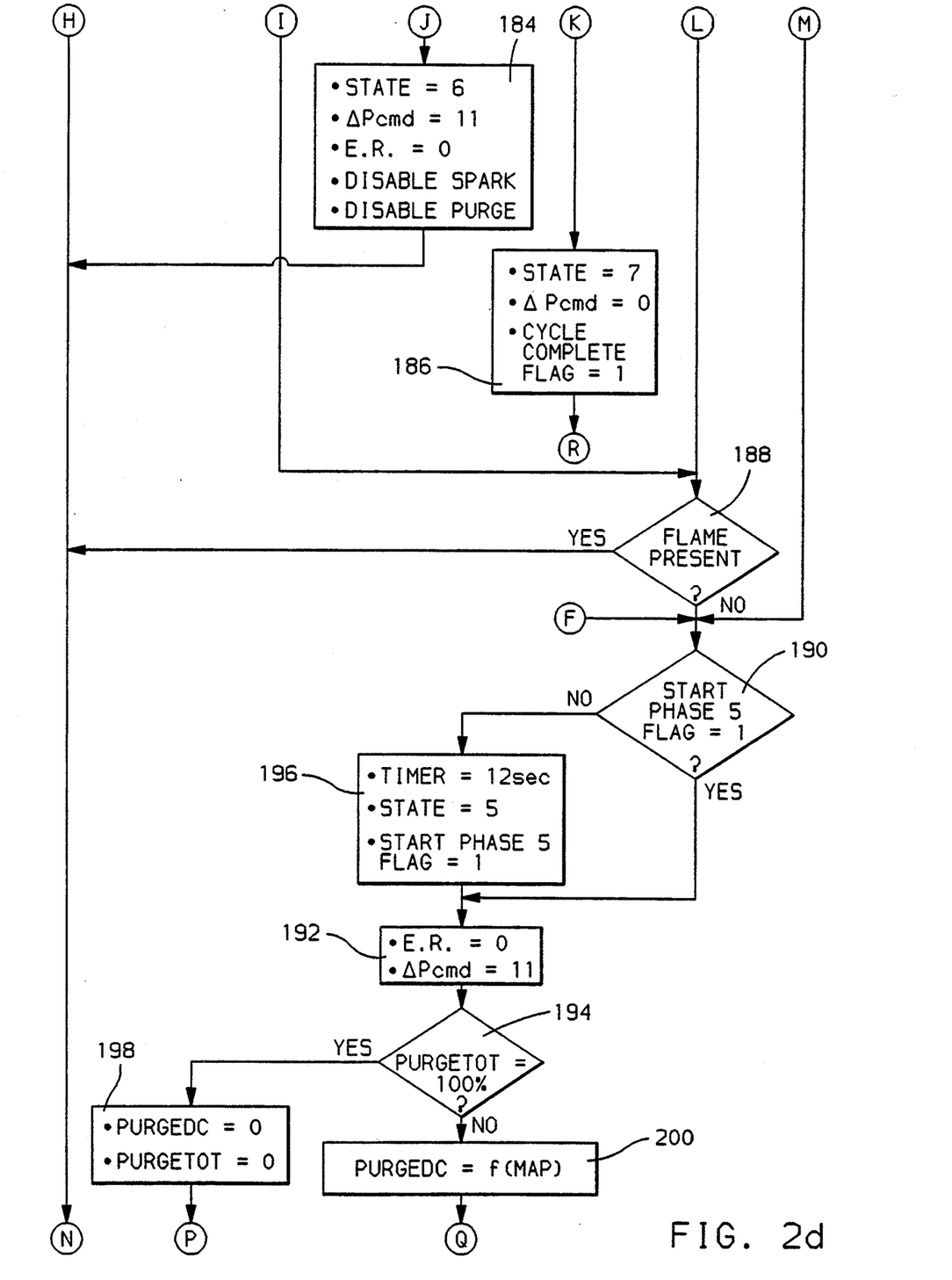
Figure 2E:
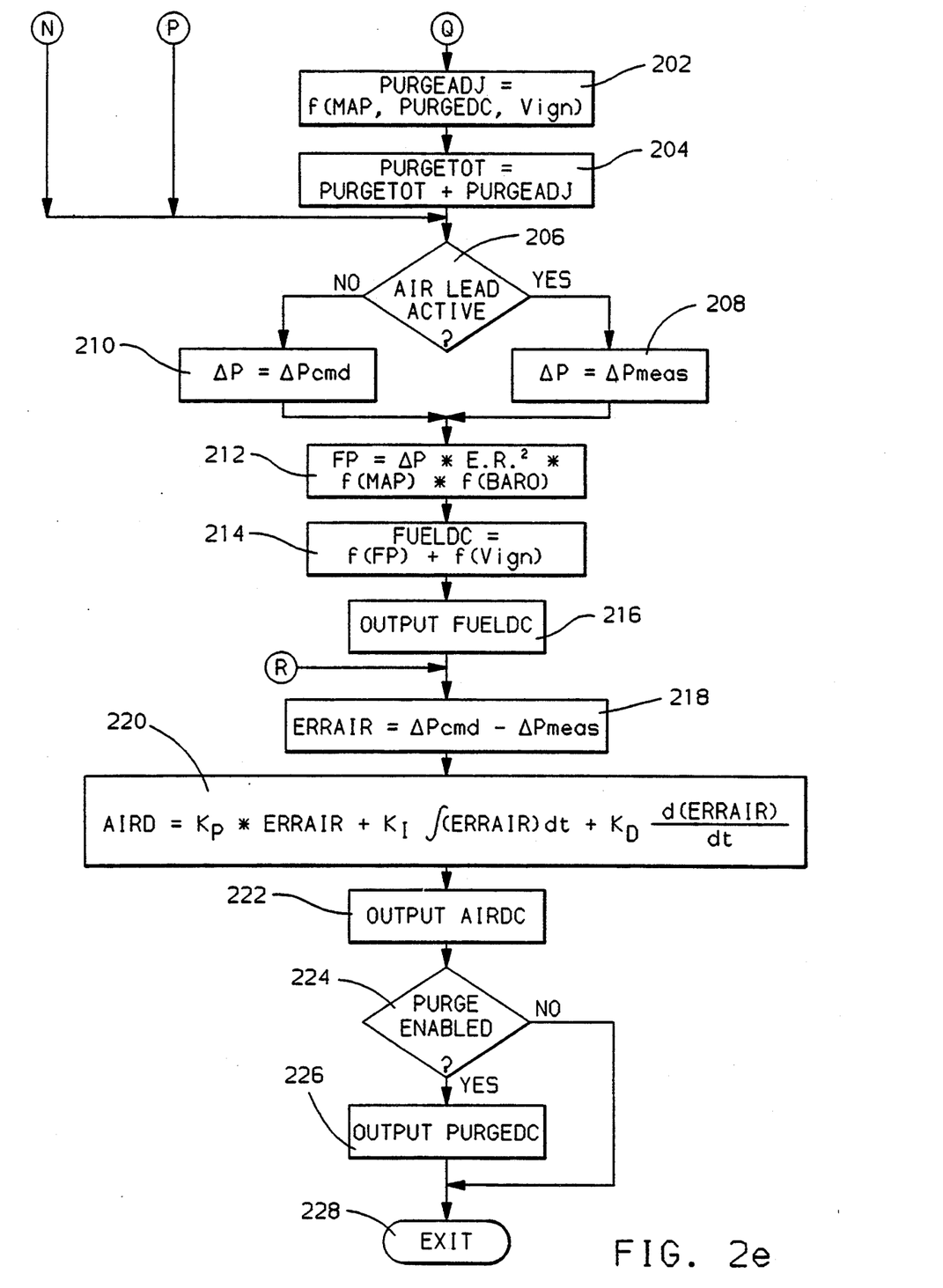

The routine used to carry out this invention in accord with the preferred embodiment is illustrated in FIGS. 2a–2e, and is entered at step 100 of FIG. 2a. This routine represents a series of instructions stored in HCM 60 non-volatile memory (not shown), for periodic sequential execution initiated by the occurrence of a periodic event, such as a conventional time-based HCM interrupt. For example, in the present embodiment, the routine is executed approximately every 6.25 milliseconds while power is applied to the system, such as when a vehicle ignition switch is rotated to its on position, providing power to the HCM 60.

The present invention provides for rapid, robust heating of engine exhaust gas, for minimum time to catalytic converter light-off and for exhaust system temperature protection. In the present embodiment, the invention is carried out through a heating cycle that may operate each time power is applied to engine 10 (FIG. 1). The heating cycle includes eight control states which are executed sequentially to vary commanded fuel and air to the heater assembly 16 (FIG. 1).

Specifically, state zero is executed first generally for system initialization. State one follows from state zero and continues to operate for two seconds or until combustion is detected in the heater assembly 16 (FIG. 1). If combustion is detected, state two is activated for a period of time, such as one second in this embodiment, during which time energy delivered from the heater assembly to the exhaust gas is rapidly increased from the level of state one to a maximum level.

After state two, state three is entered and executed for a period of time, such as four seconds in this embodiment, during which time fuel and air are provided to the heater assembly to transfer maximum heat energy to the exhaust gas path. After four seconds in state three, state four is activated for a predetermined period of time, such as approximately seven seconds in this embodiment, during which time heat energy is reduced to maintain exhaust gas heating at a constant level while the catalytic converter 12 (FIG. 1) heats up therefrom.

After state four, state five is activated for a predetermined period of time, such as four seconds in this embodiment, during which time fueling of the heater assembly is discontinued and the fuel path to the heater assembly is purged, as described. After state five, state six becomes active for a predetermined period of time, such as 19 seconds in this embodiment, during which fueling remains discontinued and air delivered to the heater assembly is reduced to enlean the exhaust gas and improve catalytic converter efficiency, to provide a reduced level of carbon monoxide and hydrocarbons in the exhaust gas, consistent with generally known emission control goals. Finally, after state six, state seven is entered and executed to provide a controlled end to the heating cycle.

Returning to the routine of FIGS. 2a–2e, which illustrate steps used to carry out this eight state control approach, entry into the routine is made at step 100 of FIG. 2a, and then the routine flows to step 102, to read a present value for above-described HCM 60 input signals, including ΔPmeas, MAP, Vbat, Vign, and Tcat. A measure of ambient air pressure BARO for use in the present embodiment may be made through a reading of the signal MAP prior to engine startup.

The routine then moves to step 104, to determine if the present iteration of the routine of FIGS. 2a–2e is the first since power was applied to the HCM 60 (FIG. 1). If so, the routine moves to step 110, to determine if the catalytic converter 12 (FIG. 1) is of sufficient temperature that external heating through operation of heater assembly 16 (FIG. 1) is assumed to be unnecessary for rapid light-off. In this embodiment, if Tcat is above 100 degrees Celsius at step 110, heater assembly operation is avoided by not setting a heater enable flag, and by moving to step 116, to be described.

Alternatively at step 110, if Tcat is below 100 degrees Celsius, the routine moves to step 112, to set the heater enable flag, and then moves to step 130, to determine if the ignition power that initially invoked the routine of FIGS. 2a–2e is still on. Such may be checked by monitoring an ignition power line (not shown) input to the HCM 60. In this embodiment, heater operations are not executed unless ignition power is maintained and the engine 10 (FIG. 1) is running. Accordingly, if ignition power is not applied as determined at step 130, the routine moves to step 128, to discontinue further heater operations, to be described, and if ignition is enabled at step 130, the routine moves to step 132, to determine if a cycle complete flag is set indicating the present heating cycle is complete.

If the cycle complete flag is set at step 132, the routine moves to step 128, to discontinue further heater assembly operation, to be described. If the cycle is not complete, the routine moves to step 134, to determine if any prior heating control errors were detected during the present heater cycle, as indicated by an error flag being set to one. Such errors may be detected through application of generally known diagnostics to the system described in FIG. 1, such as at step 142 of the present routine, to be described. If an error is indicated by error flag being set to one as determined at step 134, the routine interrupts heater assembly operation for the present cycle by moving to step 128, to be described. If the error flag is clear at step 134, the routine moves to conduct heating operations in accord with the present embodiment, starting at step 136.

Specifically, at step 136, flame flag is checked to determine if flame (combustion) has been detected in the heater assembly 16 (FIG. 1) since the start of the present heater cycle. Flame is detected at a later step of the present routine, to be described, at which time flame flag will be set to one. If flame flag is set to one at step 136, then of the eight control states included in the control approach of the present embodiment, a first control state (state zero) directed to heater initialization and a second state (state one) directed to initiating combustion in the heater assembly are no longer needed for the present cycle, and thus the control of the present routine advances to states 2–7 via step 170, to be described.

Alternatively, if flame flag is clear at step 136, the routine moves to step 138, to determine whether STATE, a flag indicating the present control state, is set to zero, indicating state zero is presently active. If so, the routine moves to steps 140–148 to carry out state zero operations. Alternatively, if STATE is not zero, and flame flag was not set at step 136 as described, state one must be active, and the routine moves to state one operations, starting at step 168, to be described. STATE is automatically reset to zero via conventional memory initialization operations at HCM 60 power-up.

Returning to step 104, if the present iteration of the routine of FIGS. 2a–2e is not the first in the present heating cycle, the routine moves to step 114, to determine if the heater enable flag is set, indicating heater operations are required, as described. If so, the routine moves to the previously described step 130. If heater enable flag is not set, the routine moves to step 116, to determine if the engine is running, such as may be indicated by an engine speed RPM in excess of 400 r.p.m. In an alternative embodiment, a MAP signal exceeding approximately 80 kPa may be used as an indication of a running engine.

If the engine is not running, the heater assembly operation in the present heater control cycle is suspended by moving to step 128, to be described. If the engine is running at step 116, step 118 is executed, at which the value stored to variable PURGETOT, stored in HCM 60 (FIG. 1), is assessed. The value stored as PURGETOT is an estimate, maintained through operation of the present routine, of the amount of fuel purged from the fuel delivery system of FIG. 1, especially from the fuel line 26 including the nozzle at the end thereof.

Generally, an amount of fuel remains in the hardware in which fuel is guided from fuel conduit 28 to the heater assembly 16, and especially in fuel line 26, which must be accounted for in subsequent control cycles. For example, any fuel in the line will augment the commanded fuel to the heater assembly in a subsequent control cycle, decreasing heater air/fuel ratio controllability, and potentially increasing air/fuel ratio error. The augmented fuel supplied to the heater assembly could, in the subsequent heating cycle, extinguish any flame present therein, or could delay start of heater assembly combustion. Additionally, any fuel remaining in the line 26 after heater operation is complete, could contaminate the line, restricting the fuel path to the heater assembly, reducing the life of the heating system of FIG. 1.

To address such concerns, a purge operation is provided in this embodiment, to drive excess fuel out of the fuel supply system of FIG. 1, especially out of the fuel line 26 and the nozzle at the end thereof. An estimate of the amount of fuel blown out, and thus of the amount remaining in the lines 26 is made, and accounted for in a subsequent heating cycle. The purge operation is provided mainly through steps 118–126, and through state five of the present routine.

Specifically at step 118, a check is made to determine if PURGETOT, the stored estimate of the total amount purged from the fuel system for the present heating cycle, indicates a fully purged fuel system. If so, purge operations are discontinued for the present cycle by moving to step 126, to reset PURGETOT to zero, in preparation for purge after a subsequent heating cycle, and by clearing a command PURGEDC, disabling purge.

As described PURGEDC is a commanded duty cycle issued by the HCM 60 (FIG. 1) for opening a conduit 22 from the engine intake manifold 18 to fuel line 26, to allow fuel from the fuel line and the nozzle to be drawn into the intake manifold via manifold vacuum, wherein the lower pressure of the intake manifold during normal engine operation pulls the fuel hung up in fuel line 26 and nozzle to the intake manifold to be drawn into the engine along with engine intake air.

After setting PURGEDC to zero, the routine moves to step 128 to shut down the heater assembly until such time as conditions require its re-activation. Specifically, to shut down the heater assembly, spark to the heater assembly is disabled, so ignition driver 48 (FIG. 1) will stop driving spark plug 46, an equivalence ratio E.R., used as a fuel control parameter in the present routine is set to zero, purge is set in a disable mode, and commanded air to the heater assembly $\Delta$Pcmd is set to zero. The routine next proceeds to step 206, to be described.

Returning to step 118, if PURGETOT is not at 100 percent, indicating that more purge may occur during the present heating cycle, the routine moves to steps 120–124, to continue with a purge operation. Specifically, the routine first moves to step 120, to adjust PURGEDC, the purge solenoid valve commanded duty cycle, to a calibrated beneficial purge rate, reflecting an application specific balance between a desire to purge rapidly and a desire to preserve stable engine operation by not blowing fuel from line 26 (FIG. 1) into the engine intake air stream so rapidly as to significantly perturb engine air/fuel ratio. In this embodiment, approximately 0.91 milliseconds of purge over the periodic 6.25 millisecond purge solenoid valve control period is calibrated as reflecting a beneficial balance.

After setting PURGEDC at step 120, the routine moves to step 122, to estimate PURGEADJ, the amount of fuel such a purge rate would purge from the system over the 6.25 millisecond control period, as a function of the degree of pressure difference from the fuel line 26 to the intake manifold as indicated by MAP, as a function of the command PURGEDC, and as a function of Vbat, so as to provide for variations in purge valve response time and in PURGEDC caused by fluctuations in supply voltage Vbat. The functional relationship represented at step 122 may be determined for a system in a conventional calibration step using generally known relationships between fluid flow rate and fluid pressure gradient.

After determining PURGEADJ at step 122, the routine moves to step 124, to update PURGETOT, the total amount purged for the present heating cycle by PURGEADJ, to maintain a running estimate of the amount purged from the fuel system of FIG. 1, as described. The routine then proceeds to step 206, to be described.

State zero operations of the present embodiment include heater initialization functions. As described, STATE, which is reset to zero at the start of a new heater cycle, indicates the present heater control state. If STATE is zero at step 138, the routine moves to step 140, to initialize heater control commands, by setting $\Delta$Pcmd and E.R. to zero, and by disabling purge. The routine then moves to step 142, to carry out conventional system diagnostics, for example checking that HCM input signal levels are within predetermined ranges and are reasonable with respect to each other. Next, the routine moves to step 144, to determine if a fault was discovered in the conventional diagnostics of step 142. If so, the routine moves to step 146, to set error flag to one, indicating the fault. The routine then moves to step 206, to be described.

Alternatively at step 144, if no fault was detected through the diagnostic operations of step 142, the routine moves to step 148, to determine if the engine is running, such as indicated by engine speed RPM exceeding 400 r.p.m. If the engine is not running, as detected at step 148, the next state, state one, will not be executed, by moving to step 206, to be described. Otherwise, if the engine is determined to still be running at step 148, the routine moves to state one operations, including steps 150-164.

As described, state one attempts to light the heater assembly 16 (FIG. 1), by setting appropriate fuel, air and spark commands to the heater assembly. Specifically in state one, STATE is set to one and TIMER, a real time variable is cleared at step 150. TIMER is used to monitor the amount of real time in state one and, in this embodiment, is periodically updated in a conventional background loop to reflect the amount of elapsed real time since TIMER was last reset. TIMER is used in state one at step 168, to determine the amount of time in state one without detected flame in the heater assembly 16 (FIG. 1).

In this embodiment at step 168, if more than two seconds of operation in state one take place without detected flame, a fault condition is assumed, and further combustion attempts are discontinued by moving from step 168 (of state one) to step 190 (state 5), to be described. However, state one operation is continued by moving to step 152 if TIMER is less than two seconds at step 168. Step 152 is also executed after step 150, in the case of a first pass through state one operations.

At step 152, spark in the heater assembly 16 is activated and an air command is set in a predetermined manner to achieve rapid combustion in the heater assembly. Sufficient levels of fuel and air must be present in the heater assembly to support combustion when the spark plug 46 (FIG. 1) is firing. However, metering air or fuel in at too rapid a rate may overwhelm the system, unnecessarily delaying combustion. In this embodiment, a commanded air rate equivalent to a pressure drop across pressure sensor 44 of approximately 5 inches of water (0.184 p.s.i.) provides a combustion compatible heater intake air rate without blowing any fuel resident in heater assembly 16 (FIG. 1) out of the combustion area of the heater assembly.

After setting an air command rate at step 152, spark is enabled, such that periodic spark commands will be issued from HCM 60 (FIG. 1) to ignition driver 48, causing spark plug 46 to periodically spark, such as approximately every 15.625 milliseconds in this embodiment. Further at step 152, fuel lead control is activated, wherein fuel is commanded to the heater assembly 16 (FIG. 1) based on the commanded pressure drop $\Delta$Pcmd, without adjustment for sensed air rate $\Delta$Pmeas.

While air lead control, in which a commanded fuel rate is adjusted for sensed air rate, provides beneficial compensation for such system control disturbances as exhaust gas backpressure fluctuations, fuel lead control is necessary in this embodiment early in the heater control cycle, such as during engine cranking, when the $\Delta$Pmeas signal has a high potential to contain noise spikes, which may provide a misleading indication of measured heater intake air rate. However, air-lead control may be more appropriate after potential for injection of noise into the $\Delta$Pmeas signal decreases, such as after initial engine cranking. Accordingly, the control in this embodiment of the invention switches from fuel lead to air lead at an appropriate time in the control cycle, such as at a time when a relatively "clean" $\Delta$Pmeas signal may be provided from sensor 44.

Continuing with step 152 of the present routine, fuel lead is activated, such as by setting a fuel lead flag in HCM 60 memory. The routine then moves to step 153, to assign a value to FILLCNT as a function of PURGETOT. FILLCNT represents an estimate of the number of iterations of the present routine required to fill the fuel line 26 and the nozzle at the end thereof (FIG. 1).

While at a fixed fueling rate, FILLCNT should be substantially constant, the estimate of the amount of fuel residue in the fuel line and nozzle, if any, may not be constant and will reduce that number of iterations. Accordingly, FILLCNT is made variable at step 153, as a function of PURGETOT. The functional relationship between FILLCNT and PURGETOT may be calibrated in a conventional calibration step for a given fueling system, as the number of iterations of the present routine, executed in this embodiment about every 6.25 milliseconds, needed to fill the fuel line 26 and nozzle for a given PURGETOT. This functional relationship may be represented as a conventional lookup table in HCM memory.

After determining FILLCNT at step 153, the routine advances to step 154 to compare COUNTER to FILLCNT. COUNTER is cleared each time power is applied to a disabled HCM 60, and is used to count the number of iterations of the present routine while in state one. After COUNTER exceeds FILLCNT as determined at step 154, it may be assumed that the fuel line 26 and nozzle at the end thereof is substantially filled with fuel, and compensation for any fuel residue in the fuel line 26 and nozzle at the end thereof may cease.

At such time, the routine moves from step 154 to step 160, to determine E.R., the desired air/fuel ratio term, as a function of Tcat, as Tcat affects the amount of fuel needed to initiate combustion in state one. For example, there are generally understood relationships between fuel condensation and vaporization and fuel temperature. Such relationships should be reflected in the functional relationship indicated at step 160.

Alternatively at step 154, if fuel line filling is not complete, the routine moves to step 156, to increment COUNTER. The routine then moves to step 158, to set E.R. to ERMAX, a maximum fuel/air ratio value as set for in accord with the present embodiment, for rapid fuel line filling. For example, an E.R. of approximately 4.0 would result in a sufficiently rapid fueling rate for the present embodiment to fill the fuel line 26 (FIG. 1) and nozzle at a sufficiently rapid rate.

After determining E.R. at either of steps 160 or 158, the present routine moves to step 162, to determine whether flame is present in the heater assembly from the magnitudinal relationship between the signal Vsense (FIG. 1), as input to the HCM 60, and a predetermined threshold voltage, as described in copending application U.S. Ser. No. 07/902249, filed Jun. 22, 1992, entitled "Combustion Detection," assigned to the assignee of this application. If flame is determined to be present at step 162, the routine moves to step 164, to set flame flag to one, and to clear TIMER, to start a new time period indicating the amount of time combustion has been present in the heater assembly 16 (FIG. 1).

Next, the routine moves to steps 166-188 to execute control states 2–4, and 6–7, to control the administration of fuel and air to the heater assembly 16 (FIG. 1) in accord with the present embodiment. Alternatively at step 162, if flame is determined not to be present, the routine moves to step 206, to be described.

Returning to step 162, state two is entered at step 164 when flame is detected during operation in state one, as described. The routine then moves to step 166, to set STATE to two, to set ΔPcmd to a level which is predetermined to produce a pressure drop across pressure sensor 44 (FIG. 1) of approximately 22 inches of water, to set the commanded air/fuel ratio value E.R. to 0.9 for use in a subsequent fuel command calculation, and to activate fuel lead control. As described, state two attempts to rapidly increase heat energy to the exhaust gas from the levels of state one. Furthermore, as discussed, fuel lead control is preferred in state two, as a significant potential remains for noise infecting the pressure sensor output signal ΔPmeas. After setting state two parameters at step 166, the routine moves to step 188, to again check for the presence of flame (combustion) in the heater assembly 16 (FIG. 1).

Returning to step 136, if flame flag is set, the routine bypasses state one to step 170, to determine the amount of time combustion has been present in the heater assembly 16 (FIG. 1). If, at step 170, TIMER is less than one second, state two is active, and the routine moves to step 166, as described. If TIMER exceeds or is equal to one second at step 170, state two is complete, and the routine moves to step 172, to compare TIMER to five seconds. If TIMER is less than five seconds, the routine moves to state three operations at step 174, by setting STATE to three, holding ΔPcmd at 22 inches of water equivalent pressure drop across pressure sensor 44 (FIG. 1), increasing E.R. to 1.0, and activating air lead control.

As described, state three attempts to drive maximum heat energy to the heater assembly 16 through high fuel and air commands in proper proportion. As such, the air/fuel ratio command magnitude as dictated by E.R. is set at a maximum level, to provide for a high level of heat transfer to the heater assembly 16 (FIG. 1) in state three. Furthermore, in state three, there is sufficient confidence in the pressure sensor 44 output signal to allow air lead control to become active, in which the fuel command follows from the air rate detected into the heater assembly 16. After setting state three parameters at step 174, the routine moves to the described step 188.

Returning to step 172, if TIMER exceeds or is equal to five seconds, state three is complete, and the routine moves to step 176, to compare TIMER to twelve seconds, to determine whether state four is active. State four generally reduces commanded fuel and air to the heater assembly to a degree predetermined to hold the temperature of the catalytic converter at a substantially steady level. Accordingly at step 176, if TIMER is less than twelve seconds, the routine moves to step 178, to set state four parameters, including setting STATE to four, setting ΔPcmd to a level predetermined to provide a pressure drop across pressure sensor 44 (FIG. 1) of about 16 inches of water, holding E.R. at 1.0, and maintaining air lead as active. The routine then moves to the described step 188.

Alternatively at step 176, if TIMER exceeds or is equal to twelve seconds, state four is complete, and the routine moves to step 180, to compare TIMER to sixteen seconds. If TIMER is less than sixteen seconds at step 180, state five, the purge state, is assumed to be active, and the routine moves to the purge activities of state five, starting a step 190. If, at step 190, a flag indicating the start of state five, which is cleared to zero at power-up of the HCM 60 (FIG. 1), is clear, the routine moves to step 196, to set TIMER to twelve seconds, to insure a precise amount of purge time for the system (four seconds in this embodiment), as TIMER may be significantly below or above twelve seconds at the start of state five. Additionally at step 196, STATE is set to five, and the flag indicating the start of state five is set.

Next, or if the present iteration is not the start of state five, the routine moves to step 192, to clear E.R., so as to discontinue metering of fuel from the fuel control module 24 (FIG. 1), and to set ΔPcmd to a value equivalent to eleven inches of water pressure drop across pressure sensor 44 (FIG. 1).

The routine then moves to step 194 to determine if PURGETOT, the total amount estimated to be purged, is at 100 percent of its range. If so, the routine moves to step 198, to discontinue purge, by setting the commanded purge solenoid valve duty cycle PURGEDC to zero, and by clearing PURGETOT, for the next purge operation after the next heating cycle. The routine then moves to step 206, to be described.

Alternatively at step 194, if PURGETOT is not yet at its maximum value, the routine moves to continue the purge operation starting at step 200, at which PURGEDC is calculated as a function of MAP, as MAP indicates the degree of vacuum in the engine intake manifold 18 (FIG. 1) that will draw fuel back through the fuel line 26 and into the intake manifold 18. The functional relationship between MAP and PURGEDC should be calibrated by balancing a desire for rapid purging of the system with a desire not to perturb significantly the engine air/fuel ratio, as described. For example, typical engine air/fuel ratio control can compensate with relatively minor performance or emissions penalty for small perturbations in actual engine air/fuel ratio. Accordingly, relatively small purge quantities should be permitted back into the intake manifold, yet such quantities should be sufficiently large to permit rapid purging of the fuel system. Additionally, PURGEDC may be determined also as a predetermined function of Vign, so as to compensate for the effect of varying ignition voltage on purge valve response and on the level of PURGEDC.

Returning to step 200, after determining PURGEDC, the routine moves to step 202, to determine PUR- GEADJ as the estimated amount of fuel that will be purged through application of the determined PURGEDC. As described, PURGEADJ is determined as a function of MAP, PURGEDC, and Vign. After determining PURGEADJ, the routine moves to step 204 to adjust PURGETOT by adding to it the amount PURGEADJ, so that PURGETOT will reflect the total estimated fuel purged for the present heater cycle. The routine then moves to step 206, to be described.

Returning to step 180, if TIMER exceeds or is equal to sixteen seconds, the routine moves to step 182, to compare TIMER to 35 seconds, to determine if state six is active. IF TIMER is less than 35 seconds, the routine moves to step 184, to set state six parameters, by setting ΔPcmd to a rate predetermined to provide pressure drop of approximately eleven inches of water across pressure sensor 44 (FIG. 1), by setting E.R. to 0, to discontinue fueling the heater assembly 16 (FIG. 1), and to disable spark and purge. The routine then moves to step 206, to be described.

Alternatively at step 182, if TIMER exceeds 35 seconds, the routine moves to state seven at step 186, to set the air command ΔPcmd to zero, to set STATE to seven, and to set the cycle complete flag, to discontinue further heater control operations in accord with the present routine. The routine then moves to step 218, to be described.

Steps 206–220 are executed to apply the E.R. and ΔPcmd, as determined through operation of the routine of FIGS. 2a–2e, in a determination of an appropriate fuel and air command to fuel control module 24 (FIG. 1) and blower 32 (FIG. 1) respectively. Specifically, at step 206, a check is made to determine whether air lead has been activated, such as in states three and four of the present routine. If air lead is active, the routine moves to step 208, to set a value ΔP equal to ΔPmeas, the measured pressure drop across pressure sensor 44 (FIG. 1). Alternatively at step 206, if air lead is not active, fuel lead must be active, such as in states one and two, and the routine moves to step 210, to set ΔP to ΔPcmd, the commanded air rate. ΔP will be used in a determination of a fuel command. In air lead control, fuel follows a measured air rate to the heater assembly 16 (FIG. 1), such that commanded fuel to the heater assembly 16 should be a function of ΔPmeas, as provided for in step 208. However in fuel lead control, fuel may be commanded without regard to the measured air rate, as provided for in step 210.

After setting ΔP at either of steps 208 or 210, the routine moves to step 212, to determine a desired fuel pressure FP, as follows $$FP = \Delta P * E.R.^2 * f(MAP) * f(BARO)$$

in which f(MAP) and f(BARO) are predetermined functions reflecting the generally understood influence of engine inlet air pressure and ambient air pressure on the ease of air passage through the system of FIG. 1, and the degree that fuel should be adjusted based thereon, to attempt to maintain a desired air/fuel ratio in the heater assembly 16 (FIG. 1).

After determining an appropriate FP at step 212, the routine moves to step 214, to convert the desired FP to a fuel injector duty cycle FUELDC that will deliver the desired fuel pressure FP, according to the following $$FUELDC = f(FP) + f(Vign)$$

in which f(FP) is function for the specific hardware of FIG. 1, as may be determined through generally understood calibration procedures, that reflects the relationship between a duty cycle of a specific conventional fuel injector and a desired fuel pressure FP in the fuel line 26 (FIG. 1), and in which the offset f(Vign) is a predetermined function describing the generally understood effect of fuel injector supply voltage on fuel quantity delivered by the injector.

After determining FUELDC at step 214, the routine moves to step 216, to output FUELDC to the fuel control module 24 of FIG. 1. Next, the routine moves to step 218, to determine ERRAIR, the air error term, as the difference between ΔPcmd, the commanded pressure drop across pressure sensor 44 (FIG. 1) and ΔPmeas, the measured (actual) pressure drop across the pressure sensor. In accord with generally known classical control theory principles, ERRAIR is used at the next step 220 in a proportional-plus-integral-plus derivative control term to calculate the duty cycle of the blower 32 (FIG. 1), as follows $$AIRDC = K_p * ERRAIR + K_I * \int (ERRAIR) dt + K_d * d(ERRAIR)/dt$$

in which $K_p$ is a predetermined proportional term gain, $K_I$ is an integral term gain, and $K_d$ is a derivative term gain, as generally known in the art, wherein such gains are selected in accord with a desired air control transient response, and a desired steady state error in the air term.

After determining AIRDC, the routine moves to step 222, to output AIRDC to drive circuit 40, for application as a drive current to blower 32 (FIG. 1), as described. The routine then moves to step 224, to determine if purge is enabled. If so, PURGEDC is output to purge valve (not shown) of fuel control module 24 (FIG. 1) at step 226. Next, or if purge was not enabled at step 224, the routine exits via step 228, to resume execution of any HCM 60 (FIG. 1) processes that were interrupted by the execution of the routine of FIGS. 2a–2e.

As described, the routine of FIGS. 2a–2e will repeat approximately every 6.25 milliseconds while the HCM is operating in the manner described. Operation of the HCM 60 (FIG. 1) may be terminated at the end of each heating cycle, such as after FUELDC and AIRDC return to zero in state seven of the present routine, such that heater operations would not resume until a subsequent engine restart.

The description of the preferred embodiment for the purpose of explaining this invention is not to be taken as limiting or restricting the invention since many modification may be made through the exercise of skill in the art without departing from the scope of the invention.

The embodiments of the invention in which a property or privilege is claimed are described as follows:

1. A method for controlling an air rate at which air is passed through an air line and a fuel rate at which fuel is passed through a fuel line to an exhaust gas heater for heating internal combustion engine exhaust gas during heater operating periods, comprising the steps of:
   sensing a start of a first heater operating period;
   controlling the air rate and the fuel rate during the first heater operating period;
   sensing an end of the first heater operating period;

reducing the fuel rate toward a zero fuel rate upon sensing the end of the first heater operating period; and removing a quantity of fuel from the fuel line after reducing the fuel rate.

2. The method of claim 1, further comprising the steps of:

estimating a residual quantity of fuel remaining in the fuel line after removing the quantity of fuel from the fuel line;

sensing a start of a second heater operating period following the sensed end of the first heater operating period;

controlling the air rate and the fuel rate during the second heater operating period; and reducing the fuel rate by a predetermined function of the estimated residual quantity of fuel for a predetermined time period following the start of the second heater operating period.

3. The method of claim 1, further comprising the step of:

providing the amount of fuel removed from the fuel line to a predetermined one of the set including an inlet air path to the engine and an inlet fuel path to the engine.

4. The method of claim 1, further comprising the steps of:

sensing when combustion is not present in the heater; and reducing the fuel rate toward a zero fuel rate upon sensing that combustion is not present in the heater.

5. The method of claim 1, wherein the step of controlling the air rate and the fuel rate further comprises the steps of:

providing for combustion in the heater by setting a desired air quantity to a predetermined lighting air quantity and by setting a desired heater air/fuel ratio to a predetermined lighting air/fuel ratio;

sensing combustion in the heater;

providing for a rapid increase in heater energy output upon sensing combustion in the heater by setting the desired air quantity to a predetermined ramp air quantity and setting the desired heater air/fuel ratio to a predetermined ramp air/fuel ratio;

adjusting the air rate in accord with the set desired air quantity; and adjusting the fuel rate in accord with the set desired heater air/fuel ratio and a predetermined one of the set desired air quantity and the adjusted air rate.

6. The method of claim 5, further comprising the steps of:

estimating when heater energy output has reached a predetermined maximum output; and stabilizing engine exhaust gas temperature when heater output energy is estimated to have reached the predetermined maximum output, by setting the desired air quantity to a predetermined hold air quantity and setting the desired heater air/fuel ratio to a predetermined hold air/fuel ratio.

7. The method of claim 6, further comprising the step of:

enleaning air/fuel ratio in the engine exhaust gas by setting the desired air quantity to a predetermined enleanment air quantity and setting the desired heater air/fuel ratio to a predetermined enleanment air/fuel ratio.

8. The method of claim 5, further comprising the steps of:

sensing an actual air rate;

calculating an air rate error as the difference between the set desired air rate and the actual air rate;

determining an air rate correction as a predetermined function of the air rate error; and modifying the adjusted air rate in accord with the air rate correction, and wherein the step of adjusting the fuel rate adjusts the fuel rate in accord with the set desired heater air/fuel ratio and a predetermined one of the set desired air quantity and the sensed actual air rate.

* * * * *